United States Patent
Thakar et al.

(10) Patent No.: US 12,038,760 B1
(45) Date of Patent: Jul. 16, 2024

(54) SYSTEM TO MANIPULATE SLIDING OBSTACLES WITH NON-HOLONOMIC AUTONOMOUS MOBILE DEVICE

(71) Applicant: AMAZON TECHNOLOGIES, INC., Seattle, WA (US)

(72) Inventors: Shantanu Thakar, Mountain View, CA (US); Pragyana K. Mishra, Seattle, WA (US); Nathalie Majcherczyk, San Diego, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 234 days.

(21) Appl. No.: 17/659,088

(22) Filed: Apr. 13, 2022

(51) Int. Cl.
G05D 1/02 (2020.01)
G05D 1/00 (2006.01)

(52) U.S. Cl.
CPC .......... G05D 1/027 (2013.01); G05D 1/0227 (2013.01); G05D 1/0251 (2013.01)

(58) Field of Classification Search
CPC ..... G05D 1/027; G05D 1/0227; G05D 1/0251
See application file for complete search history.

(56) References Cited

U.S. PATENT DOCUMENTS

| 9,987,745 | B1 * | 6/2018 | Berard | B25J 9/1661 |
| 2019/0248002 | A1 * | 8/2019 | Deyle | B25J 19/023 |
| 2023/0066592 | A1 * | 3/2023 | Shanor | G06V 10/764 |

OTHER PUBLICATIONS

S. Chitta, B. Cohen and M. Likhachev, "Planning for autonomous door opening with a mobile manipulator," 2010 IEEE International Conference on Robotics and Automation, Anchorage, AK, USA, 2010, pp. 1799-1806, doi: 10.1109/ROBOT.2010.5509475 (Year: 2010).*

* cited by examiner

*Primary Examiner* — Brian P Sweeney
(74) *Attorney, Agent, or Firm* — Lindauer Law, PLLC

(57) ABSTRACT

A physical space may contain sliding doors in various places such as between rooms, as closet doors, on furniture, and so forth. An autonomous mobile device (AMD) capable of non-holonomic motion may selectively contact a portion of the sliding door and apply a force to open or close the door. The AMD moves to an initial pose relative to the door, with a portion of the AMD coming into contact with the door. The AMD then rotates and translates, relative to the door, applying a force to the door. Sensor data, such as linear acceleration, rotation, drive wheel torque, and so forth is used as input to determine the next movement in a series of motions, resulting in continued contact and force application. As the end of travel for this motion is reached, the AMD may separate from the door, reposition, and continue to apply a force to the door.

20 Claims, 6 Drawing Sheets

SYSTEM TO MANIPULATE SLIDING OBSTACLES WITH NON-HOLONOMIC AUTONOMOUS MOBILE DEVICE

BACKGROUND

An autonomous mobile device (AMD) moves throughout a physical space. The physical space may include sliding doors.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
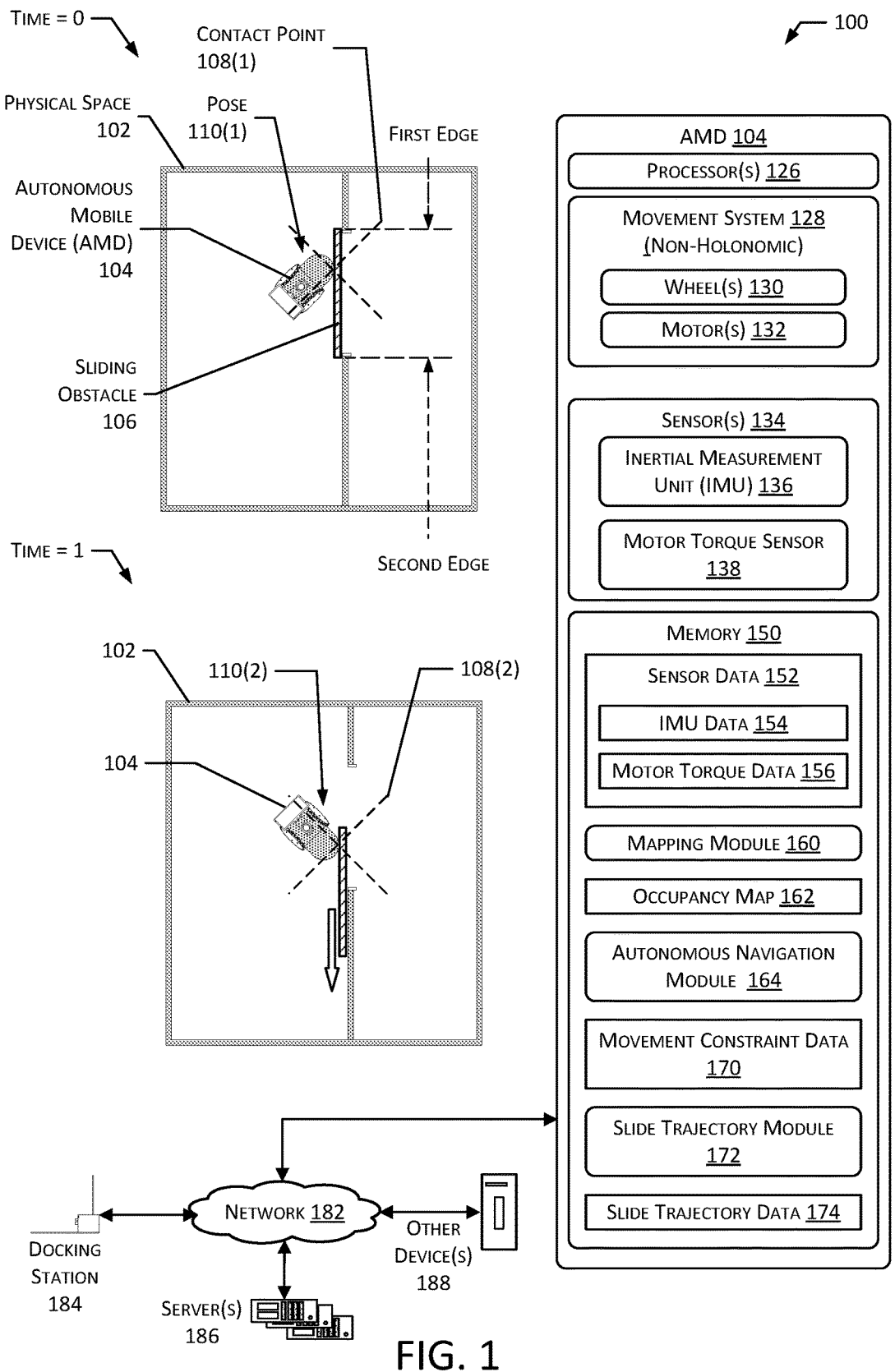
FIG. 1 illustrates an autonomous mobile device (AMD) that is able to manipulate a sliding obstacle, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement that allows the AMD to move between locations in a physical space without being driven or controlled by a user. A movement system may include one or more motors driving one or more of wheels or legs to enable the movement of the AMD. The physical configuration of the movement system, such as the relative placement of wheels with respect to the geometric center of the AMD, whether the wheels are unidirectional or omnidirectional (such as Mecanum wheels), and so forth, determines whether the AMD is "holonomic" or "non-holonomic". A holonomic system may be considered to be able to move within all of its degrees of freedom at any time. For example, a free-standing ball on a flat surface may roll in any direction on a plane, without regard to where it was a moment ago. In another example, a device with omnidirectional wheels may be holonomic because it can rotate, move forward, backward, left, right, or various angles in between. In comparison, a non-holonomic system is constrained over time when the controllable degrees of freedom are less than the overall degrees of freedom. This may manifest as the current condition limiting how it can move in the future. For example, an automobile is "non-holonomic" because while it is able to turn while moving forward and backward, it cannot move laterally to one side, rotate, and so forth, instead having to move forward or backward in a series of movements that ultimately may result in a lateral displacement or overall rotation.

While holonomic movement systems are possible, they may be infeasible for a variety of reasons. Typically, the more complex the system of movements, the more expensive the system is. This increase in cost may preclude use. For example, omnidirectional wheels are expensive compared to unidirectional wheels. Omnidirectional wheels also are prone to failure due to debris on the floor. Non-holonomic systems may be less expensive, mechanically robust, more reliable, and have lower maintenance requirements. As a result, non-holonomic systems are frequently used.

The physical space may include sliding obstacles, such as sliding doors for users, sliding panels on furniture, sliding closet doors, and so forth. If the robot includes a manipulator arm, it may be possible to use that manipulator arm to displace the sliding obstacle. However, if the robot has no manipulator arm, or if that manipulator arm is inoperative or otherwise unavailable, a traditional robot may be blocked from autonomous movement through a closed sliding door.

Described in this disclosure are techniques and systems for operating an AMD with a non-holonomic movement system to allow the AMD to apply a force to displace a sliding obstacle. As a result, the AMD is able to open or close sliding doors. This allows the AMD to perform various functions such as moving through the physical space by opening sliding doors, manipulating sliding doors per user instructions, opening sliding doors to perform sentry or inspection tasks, and so forth.

Movement constraint data is indicative of the various aspects of the AMD and how it is able to move. For example, the movement constraint data may indicate a distance between a center of rotation and a bumper, radius of a curved bumper, extent of the curved bumper, and so forth. The movement constraint data may also be indicative of relative arrangements between the AMD and a sliding obstacle that are deemed to be impermissible or ineffective, such as trying to move the sliding obstacle with a centerline of the AMD perpendicular to a plane of the sliding obstacle.

An initial contact point on the sliding obstacle is determined. For example, the initial contact point may be a minimum distance away from an edge of the sliding obstacle. The minimum distance may be based on a size of at least a portion of the AMD, such as a radius of a curved bumper.

A first pose is determined based on the initial contact point, and the AMD performs a first move to the first pose. Once in the first pose, part of the AMD is in physical contact with the sliding obstacle. For example, a bumper of the AMD is touching the sliding obstacle.

Based on the first pose and the movement constraint data, a second pose is determined. This second pose is constrained such that the AMD will remain in contact with the sliding obstacle. A second move is performed, moving the AMD to the second pose, while maintaining contact between the AMD and the sliding door. The contact and motion result in a force being applied to the sliding obstacle that may result in movement of the sliding door.

During the second move, sensor data is acquired. For example, the sensors may include an inertial measurement unit (IMU) that provides acceleration and rotation information, motor torque sensors that report the shaft torque of the motors moving the AMD, and so forth.

Based on the second pose, the movement constraint data, and the sensor data, a third pose is determined. A third move is performed, moving the AMD to the third pose, while maintaining contact between the AMD and the sliding door. Again, sensor data may be obtained.

The use of the sensor data allows the AMD to adjust subsequent motion to maintain contact with the sliding obstacle and apply a force to displace it. The sensor data may be used to determine whether the AMD is in contact with the sliding obstacle. The sensor data may also indicate whether the wheels of the AMD are slipping with respect to the floor, whether the AMD is slipping with respect to the sliding obstacle, and so forth.

In some implementations, the portion of the AMD that comes into contact with the sliding door may comprise a bumper. The bumper may be mounted to a back of the AMD. In some implementations, the main sensors, such as stereo-vision, cameras, lidar, and so forth, may have fields-of-view (FOV) that are directed towards a front of the AMD. The bumper in the rear of the AMD may be outside of these FOVs. By using a rear mounted bumper, the AMD avoids the possibility of damage due to possible collision of expensive sensors with the sliding obstacle while also maintaining proper operation of those sensors. For example, if the AMD were to use a front mounted bumper to manipulate the sliding obstacle, the sliding obstacle may be less than a minimum working distance from those sensors. In effect, the AMD may be too close to "see" the sliding door. Also, with the FOV directed towards the door, the AMD may experience a lack of localization data. By facing away from the sliding obstacle while performing the manipulation, the AMD is able to continue to gather information from the physical space, maintaining localization data and generally maintaining better overall awareness of the physical space.

By using these techniques and systems the AMD is able to interact with and change the relative position of sliding obstacles, such as sliding doors. This allows the AMD that has no available manipulators to manipulate sliding doors.

ILLUSTRATIVE SYSTEM

FIG. 1 illustrates at 100, a physical space 102 that includes an autonomous mobile device (AMD) 104. The physical space 102 may include one or more sliding obstacles 106. The sliding obstacle 106 has a first edge (such as a left upright edge of a sliding door) and a second edge (such as a right upright edge of the sliding door). In some situations, the edges may be of a doorframe or other frame within which the sliding obstacle 106 is disposed. An obstacle may comprise an object that prevents or impairs traversal by the AMD 104. For example, an obstacle may comprise a wall, stairwell, and so forth. A sliding obstacle 106 may comprise a moveable obstacle that is constrained to motion along a single axis. This may be a straight linear axis, or a curved linear axis. For example, the sliding obstacle 106 may comprise a sliding door, a sliding panel on furniture, gate, grate, and so forth. In another example, the sliding obstacle 106 may be an object that is constrained in motion by one or more other obstacles. For example, the sliding obstacle 106 may comprise a wheeled cart up against a wall that has its movement constrained by the wall.

The AMD 104 includes one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The AMD 104 includes a movement system 128 that is non-holonomic. For example, the movement system 128 may be unable to translate laterally left and right. The movement system 128 may comprise one or more wheels 130 driven by one or more motors 132 or other actuators to enable the AMD 104 to move from one location in the physical space 102 to another. For example, a motor 132 may be used to drive a wheel 130 attached to a chassis of the AMD 104, which causes the AMD 104 to move. The AMD 104 may turn, move forward, move backward, and so forth. In another example, actuators may move legs allowing the AMD 104 to walk.

The AMD 104 includes one or more sensors 134. The sensors 134 may comprise an inertial measurement unit (IMU) 136, a motor torque sensor 138, or other sensors. The IMU 136 may comprise one or more accelerometers and pyrometers, and so forth. The motor torque sensor 138 may comprise circuitry to determine a shaft torque of one or more of the motors 132 of the movement system 128. The sensors 134 as discussed in more detail with regard to FIG. 3.

The AMD 104 includes one or more memories 150. These may store sensor data 152 acquired by one or more of the sensors 134, such as IMU data 154 and motor torque data 156. For example, the IMU 136 may provide as output IMU data 154 indicative of accelerations and rotations. In another example, the motor torque sensor 138 may provide motor torque data 156 indicative of motor torque at particular times.

A mapping module 160 may use sensor data 152 to determine an occupancy map 162. The occupancy map 162 is indicative of one or more obstacles and their location in the physical space 102. For example, the occupancy map 162 may indicate the presence of walls, furniture, sliding obstacles 106, and so forth.

An autonomous navigation module 164 provides the AMD 104 with the ability to navigate within the physical space 102 without real-time human interaction. The autonomous navigation module 164 may implement, or operate in conjunction with, the mapping module 160 to determine the occupancy map 162. For example, the autonomous navigation module 164 and the mapping module 160 may perform an exploration of the physical space 102 to acquire sensor data 152 about the physical space 102 that is then used to determine the occupancy map 162. The autonomous navigation module 164 may generate path plan data that is indicative of a path through the physical space 102 from the current location to a destination location based on the occupancy map 162. The AMD 104 may then begin moving along the path. The autonomous navigation module 164 is discussed in more detail with regard to FIG. 2.

The memory 150 may also store movement constraint data 170. The movement constraint data 170 may be indicative of the various aspects of the AMD 104 and how it is able to move, limitations on such movement, and so forth. For example, the movement constraint data 170 may indicate a distance between a center of rotation and a center of a bumper, radius of a curved bumper, extent of the curved bumper, and so forth. The movement constraint data 170 may also be indicative of relative arrangements, such as angles, between the AMD 104 and the sliding obstacle 106 that are deemed to be impermissible or ineffective, such as trying to move the sliding obstacle 106 with a centerline of the AMD 104 perpendicular to a contact plane of the sliding obstacle 106. In addition to values such as the distances, the movement constraint data 170 may comprise a system of one or more equations that describe the movement constraints, specifying the boundaries of the non-holonomic motion available to the AMD 104. This is discussed in more detail with respect to FIG. 4.

The memory 150 may also store a slide trajectory module 172. The slide trajectory module 172 uses information such as the occupancy map 162 and movement constraint data 170 to determine a slide trajectory that is expressed as slide trajectory data 174. The slide trajectory indicates a series of poses 110 over time that place a portion of the AMD 104 into contact with the sliding obstacle 106 and imparts a displacement force to the sliding obstacle 106. A pose 110 may comprises a particular location in the physical space 102 and orientation. For example, the pose may be specified as coordinates with respect to three mutually orthogonal axes (e.g. X,Y,Z) and the rotations with respect to those axes.

The slide trajectory module 172 may determine an initial contact pose 110(1), at which at least a portion of the AMD 104 is expected to come into contact with a specified initial contact point 108(1) on the sliding obstacle 106. The slide trajectory module 172 may also determine a final contact pose 110(2). During operation, the slide trajectory module 172 may use the sensor data 152 to determine a next pose 110(N) that comports with the movement constraint data 170, allowing for the range of possible movements that the AMD 104 is physically capable of performing while also maintaining contact with the sliding obstacle 106.

Depending on various factors, such as how easily the sliding obstacle 106 is moving responsive to the displacement force, the linear distance that the sliding obstacle 106 is to be displaced, and so forth, the slide trajectory module 172 may use a series of sets of poses 110. For example, the AMD 104 may move and perform a first set of poses 110(1)-110(20) starting at a first contact point 108(1), move away from the sliding obstacle 106 to remove physical contact between the AMD 104 and the sliding obstacle 106, and perform a second set of poses 110(21)-(N) starting at a second contact point 108(21).

The slide trajectory module 172 may operate in conjunction with, or as a part of, the autonomous navigation module 164. For example, the autonomous navigation module 164 may determine that a sliding door is blocking a planned path to move the AMD 104 into another room. The autonomous navigation module 164 may then use the slide trajectory module 172 to move the AMD 104 to manipulate the sliding door, opening it, and allowing the AMD 104 to pass through the door. In some implementations, the slide trajectory module 172 may also be used to return the sliding obstacle 106 to a prior state, or state proximate to that. For example, the AMD 104 may use the slide trajectory module 172 to open a sliding door from a first side, pass through the sliding door, and then close the sliding door from a second side.

The AMD 104 may use network interfaces to connect to a network 182. For example, the network 182 may comprise a wireless local area network, that in turn is connected to a wide area network such as the Internet.

The AMD 104 may be configured to dock or connect to a docking station 184. The docking station 184 may provide external power which the AMD 104 may use to charge a battery of the AMD 104.

The docking station 184 may also be connected to the network 182. For example, the docking station 184 may be configured to connect to the wireless local area network 182 such that the docking station 184 and the AMD 104 may communicate.

The AMD 104 may access one or more servers 186 via the network 182. For example, the AMD 104 may utilize a wakeword detection module to determine if a user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 186 for further processing. The servers 186 may process the spoken audio and return to the AMD 104 data that may be subsequently used to operate the AMD 104.

The AMD 104 may also communicate with other devices 188. The other devices 188 may include one or more devices that are within the physical space 102 such as a home or associated with operation of one or more devices in the physical space 102. For example, the other devices 188 may include a doorbell camera, a garage door opener, a refrigerator, washing machine, and so forth. In some implementations, the other devices 188 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
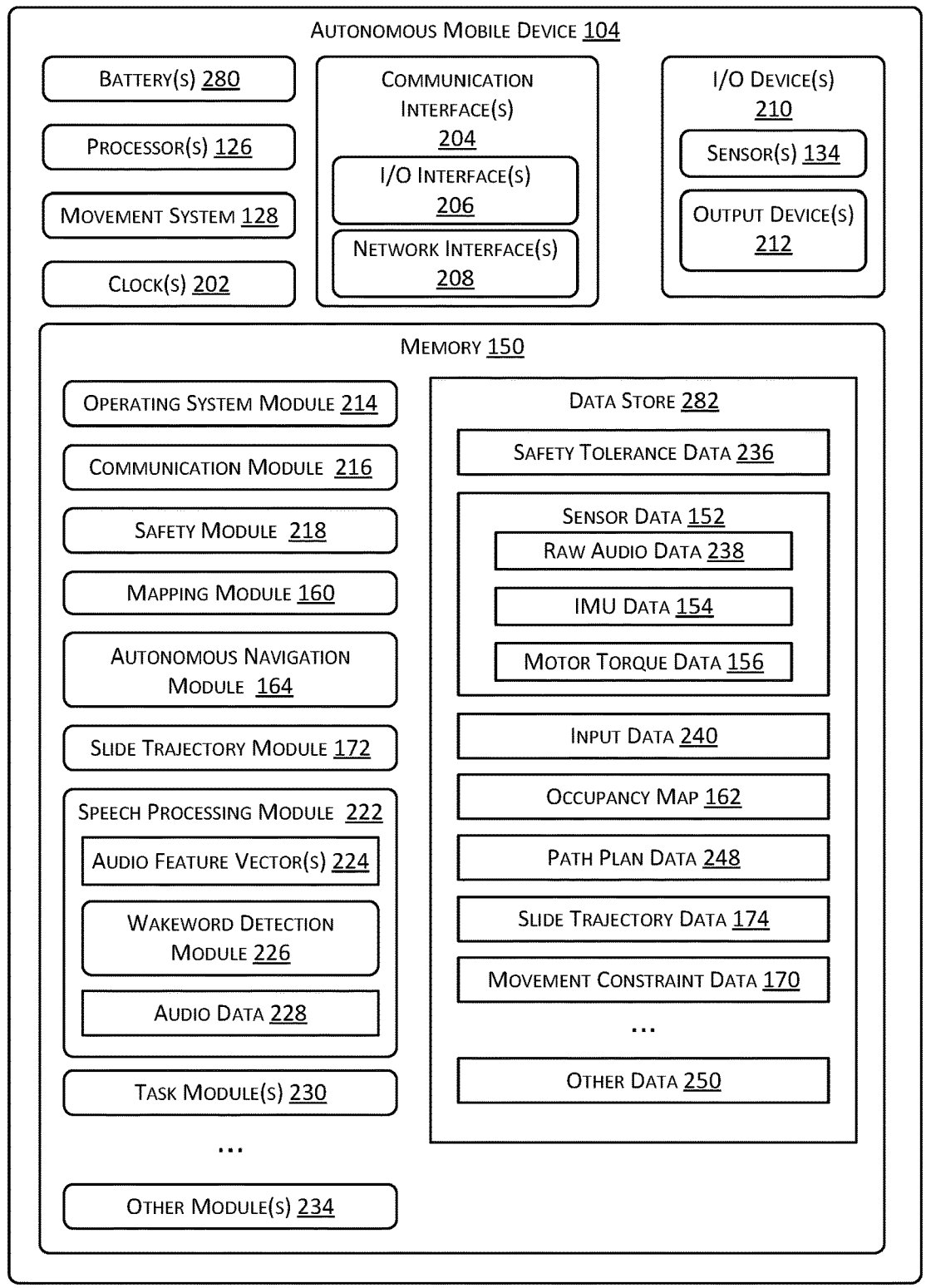
FIG. 2 is a block diagram of the AMD, according to some implementations.

FIG. 2 is a block diagram 200 of the AMD 104, according to some implementations.

The AMD 104 may include one or more batteries 280 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The movement system 128 of the AMD 104 may include one or more wheels 130 that are driven by one or more motors 132 or other actuators to enable the AMD 104 to move from one location in the physical space 102 to another.

One or more clocks 202 may provide information indicative of date, time, ticks, and so forth. For example, the processor 126 may use data from the clock 202 to associate a particular time with an action, sensor data 152, and so forth.

The AMD 104 may include one or more communication interfaces 204 such as input/output (I/O) interfaces 206, network interfaces 208, and so forth. The communication interfaces 204 enable the AMD 104, or components thereof, to communicate with other devices 188 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 210. The I/O devices 210 may include input devices such as one or more of a sensor 134, keyboard, mouse, scanner, and so forth. The I/O devices 210 may also include output devices 212 such as one or more of a motor 132, light, speaker, display, projector, printer, and so forth. In some embodiments, the I/O devices 210 may be physically incorporated with the AMD 104 or may be externally placed.

The network interfaces 208 may be configured to provide communications between the AMD 104 and other devices 188 such as other AMDs 104, docking stations 184, routers, access points, and so forth. The network interfaces 208 may include devices configured to couple to personal area networks (PANS), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 150. The memory 150 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 150 provides storage of computer-readable instructions, data structures, program modules, and other data for the operation of the AMD 104. A few example functional modules are shown stored in the memory 150, although the same functionality may alternatively be implemented in hardware, firmware, or as a system on a chip (SoC).

The memory 150 may include at least one operating system (OS) module 214. The OS module 214 is configured to manage hardware resource devices such as the I/O interfaces 206, the I/O devices 210, the communication interfaces 204, and provide various services to applications or modules executing on the processors 126. The OS module 214 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; or the Robot Operating System (ROS).

Also stored in the memory 150 may be a data store 282 and one or more of the following modules. These modules may be executed as foreground applications, background tasks, daemons, and so forth. The data store 282 may use a flat file, database, linked list, tree, executable code, script, or other data structure to store information. In some implementations, the data store 282 or a portion of the data store 282 may be distributed across one or more other devices 188 including other AMDs 104, servers 186, network attached storage devices, and so forth.

A communication module 216 may be configured to establish communication with other devices 188, such as other AMDs 104, an external server 186, a docking station 184, and so forth. The communications may be authenticated, encrypted, and so forth.

Other modules within the memory 150 may include a safety module 218, the mapping module 160, the autonomous navigation module 164, a speech processing module 222, one or more task modules 230, or other modules 234. The modules may access data stored within the data store 282, including safety tolerance data 236, sensor data 152 including the IMU data 154, motor torque data 156, and so forth, the occupancy map 162, other data 250, and so forth.

The safety module 218 may access the safety tolerance data 236 to determine within what tolerances the AMD 104 may operate safely within the physical space 102. The safety module 218 may include, or operate in conjunction with, a collision avoidance system. For example, the safety module 218 may be configured to stop the AMD 104 from moving when an obstacle is determined to be present along the AMD's 104 path of travel. Movement of the AMD 104 may be stopped by one or more of inhibiting operations of one or more of the motors 132, issuing a command to stop motor operation, disconnecting power from one or more of the motors 132, and so forth. The safety module 218 may be implemented as hardware, software, or a combination thereof.

The safety module 218 may control other factors, such as a maximum speed of the AMD 104 based on information obtained by the sensors 134, precision and accuracy of the sensor data 152, and so forth. For example, a maximum speed permitted by the safety module 218 may be based on one or more factors such as the weight of the AMD 104, nature of the floor, distance to a nearest obstacle, and so forth.

As the AMD 104 moves through the physical space 102, the mapping module 160 may use sensor data 152 to determine the occupancy map 162 of the physical space 102. For example, image data from one or more cameras may be processed to determine the presence of objects, approximate locations in the physical space 102, category of object, and so forth. The occupancy map 162 may represent dimensions of the physical space 102 and obstacles within the physical space 102. The occupancy map 162 may also include information about the sliding obstacle 106, such as size, position, and orientation.

In some implementations, the occupancy map 162 may comprise a plurality of cells with each cell of the plurality of cells representing a particular area in the physical space 102. The occupancy map 162 may indicate whether an area of the physical space 102 associated with a given cell includes a sliding obstacle 106 or other obstacle.

The autonomous navigation module 164 provides the AMD 104 with the ability to navigate within the physical space 102 without real-time human interaction. The autonomous navigation module 164 may implement, or operate in conjunction with, the mapping module 160 to determine the occupancy map 162 or other representation of the physical space 102. In one implementation, the mapping module 160 may use one or more simultaneous localization and mapping ("SLAM") techniques. The SLAM algorithms may utilize one or more of maps, algorithms, beacons, or other techniques to navigate. The autonomous navigation module 164 may use the occupancy map 162 to determine a set of possible paths along which the AMD 104 may move. One of these may be selected and used to determine path plan data 248 indicative of a path. For example, a possible path that is the shortest or has the fewest turns may be selected and used to determine the path. The path is then subsequently used to determine a set of commands that drive the motors 132 connected to the wheels 130. For example, the autonomous navigation module 164 may determine the current location within the physical space 102 and determine path plan data 248 that describes the path to a destination such as an initial pose 110 determined at least in part by the slide trajectory module 172.

The autonomous navigation module 164 may utilize various techniques during processing of sensor data 152. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 126, in response to a command received from one or more communication interfaces 204, as determined from the sensor data 152, and so forth. For example, an external server 186 may send a command that is received using the network interface 208. This command may direct the AMD 104 to proceed to find a particular user, follow a particular user, and so forth. The AMD 104 may then process this command and use the autonomous navigation module 164 to determine the directions and distances associated with carrying out the command. For example, the command to "come here" may result in the task module 230 sending a command to the autonomous navigation module 164 to move the AMD 104 to a particular location near the user and orient the AMD 104 in a particular direction. In another example, the command to "open the sliding door" may result in the task module 230 using the slide trajectory module 172 to open a sliding obstacle 106 such as a sliding door.

The slide trajectory module 172 determines slide trajectory data 174 that is expected to result in the AMD 104 applying a force to the sliding obstacle 106 to produce a linear displacement of the sliding obstacle 106. As described above, the slide trajectory module 172 may determine an initial contact point 108(1) and associated initial contact pose 110 and use the movement constraint data 170 and sensor data 152 to determine a set of poses 110 that maintain physical contact between the AMD 104 and the sliding obstacle 106 while applying a displacement force that urges the sliding obstacle 106 along its single degree of freedom, such as moving the sliding door from a first end of its track towards a second end of the track.

The speech processing module 222 may be used to process utterances of the user. Microphones may acquire audio in the presence of the AMD 104 and may send raw audio data 238 to an acoustic front end (AFE). The AFE may transform the raw audio data 238 (for example, a single-channel, 16-bit audio stream sampled at 16 kHz), acquired by the microphone, into audio feature vectors 224 that may ultimately be used for processing by various components, such as a wakeword detection module 226, speech recognition engine, or other components. The AFE may reduce noise in the raw audio data 238. The AFE may also perform acoustic echo cancellation (AEC) or other operations to account for output audio data that may be sent to a speaker of the AMD 104 for output. For example, the AMD 104 may be playing music or other audio that is being received from a network 182 in the form of output audio data. To avoid the output audio interfering with the device's ability to detect and process input audio, the AFE or other component may perform echo cancellation to remove the output audio data from the input raw audio data 238, or other operations.

The AFE may divide the raw audio data 238 into frames representing time intervals for which the AFE determines a number of values (i.e., features) representing qualities of the raw audio data 238, along with a set of those values (i.e., a feature vector or audio feature vector 224) representing features/qualities of the raw audio data 238 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 238, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 238) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 238 or the audio feature vectors 224) to one or more server(s) 186 for speech processing. The audio data 228 corresponding to audio obtained by the microphone may be processed locally on one or more of the processors 126, sent to a server 186 for routing to a recipient device or may be sent to the server 186 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by another module of the AMD 104, prior to sending to the server 186, and so forth.

The speech processing module 222 may include or access an automated speech recognition (ASR) module. The ASR module may accept as input raw audio data 238, audio feature vectors 224, or other sensor data 152 and so forth and may produce as output the input data 240 comprising a text string or other data representation. The input data 240 comprising the text string or other data representation may be processed by one or more modules of the AMD 104 to determine the command to be executed. For example, the utterance of the command "robot, come here" may result in input data 240 comprising the text string "come here". The wakeword "robot" may be omitted from the input data 240.

The AMD 104 may connect to the network 182 using one or more of the network interfaces 208. In some implementations, one or more of the modules or other functions described here may execute on the processors 126 of the AMD 104, on the server 186, or a combination thereof. For example, one or more servers 186 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to human speech. For example, the speech synthesis module may be used by the AMD 104 to provide speech that a user is able to understand.

The data store 282 may store the other data 250 as well. For example, localization settings may indicate local preferences such as language, user identifier data may be stored that allows for identification of a particular user, and so forth.

Modules described herein, such as the mapping module 160, may provide various processing functions such as de-noising, filtering, and so forth. Processing of sensor data 152, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 152. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 152 or other data. For example, the ANN may be trained using a supervised learning algorithm such that object identifiers are associated with images of particular objects within training images provided to the ANN. Once trained, the ANN may be provided with the sensor data 152 and produce output indicative of the object identifier.

Figure 3:
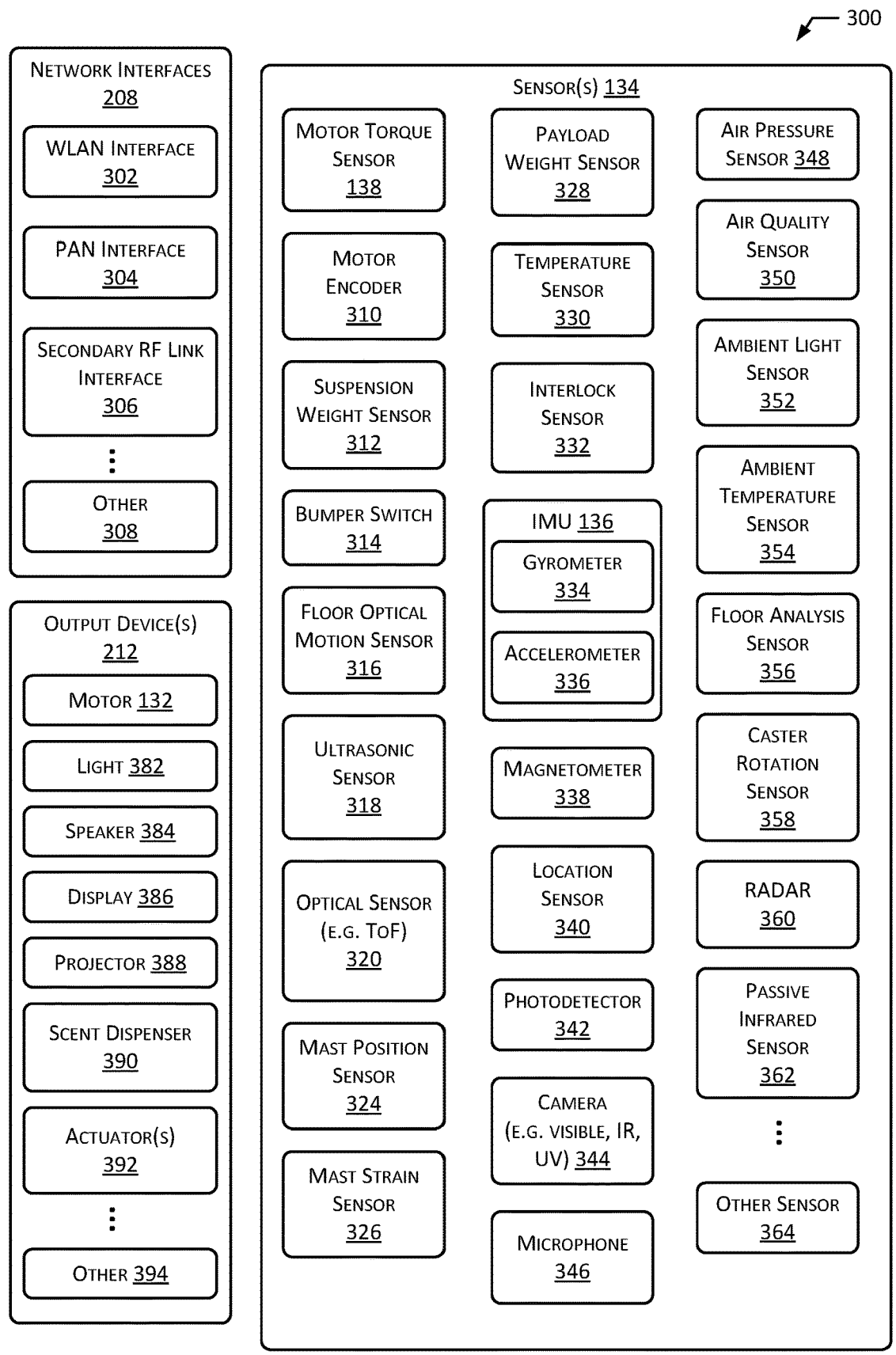
FIG. 3 is a block diagram of some components of the AMD, according to some implementations.

FIG. 3 is a block diagram 300 of some components of the AMD 104 such as network interfaces 208, sensors 134, and output devices 212, according to some implementations. The components illustrated here are provided by way of illustration and not necessarily as a limitation. For example, the AMD 104 may utilize a subset of the particular network interfaces 208, output devices 212, or sensors 134 depicted here, or may utilize components not pictured. One or more of the sensors 134, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 188 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 184, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

The motor torque sensor 138 may comprise circuitry to determine a shaft torque of one or more of the motors 132 of the movement system 128. In some implementations, the motor torque sensor 138 may be determined based on back electromotive force, output from a strain gauge, input amperage, rotational speed as provided by a motor encoder 310, or other techniques.

A motor encoder 310 provides information indicative of the rotation or linear extension of a motor 132. The motor 132 may comprise a rotary motor, or a linear actuator. In some implementations, the motor encoder 310 may comprise a separate assembly such as a photodiode and encoder wheel that is affixed to the motor 132. In other implementations, the motor encoder 310 may comprise circuitry configured to drive the motor 132. For example, the autonomous navigation module 164 may utilize the data from the motor encoder 310 to estimate a distance traveled.

A suspension weight sensor 312 provides information indicative of the weight of the AMD 104 on the suspension system for one or more of the wheels 130 or the caster. For example, the suspension weight sensor 312 may comprise a switch, strain gauge, load cell, photodetector 342, or other sensing element that is used to determine whether weight is applied to a particular wheel 130, or whether weight has been removed from the wheel 130. In some implementations, the suspension weight sensor 312 may provide binary data such as a "1" value indicating that there is a weight applied to the wheel 130, while a "0" value indicates that there is no weight applied to the wheel 130. In other implementations, the suspension weight sensor 312 may provide an indication such as so many kilograms of force or newtons of force. The suspension weight sensor 312 may be affixed to one or more of the wheels 130 or the caster. In some situations, the safety module 218 may use data from the suspension weight sensor 312 to determine whether or not to inhibit operation of one or more of the motors 132. For example, if the suspension weight sensor 312 indicates no weight on the suspension, the implication is that the AMD 104 is no longer resting on its wheels 130, and thus operation of the motors 132 may be inhibited. In another example, if the suspension weight sensor 312 indicates weight that exceeds a threshold value, the implication is that something heavy is resting on the AMD 104 and thus operation of the motors 132 may be inhibited. For example, the threshold value may comprise a weight of a load that compresses a suspension system to a minimum height, or results in a mass that exceeds a torque output of the motors 132 to maintain a minimum acceleration.

One or more bumper switches 314 provide an indication of physical contact between a bumper or other member that is in mechanical contact with the bumper switch 314. The safety module 218 utilizes sensor data 152 obtained by the bumper switches 314 to modify the operation of the AMD 104. For example, if the bumper switch 314 associated with a front of the AMD 104 is triggered, the safety module 218 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 134 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 152 indicative of one or more of a presence or absence of an object, a distance to the object, or characteristics of the object. The optical sensor 320 may use time of flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 134 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 218 and the autonomous navigation module 164 may utilize the sensor data 152 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 218. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 218 may utilize sensor data 152 obtained by the mast strain sensor 326. For example, if the strain applied to the mast exceeds a threshold amount, the safety module 218 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 218 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 280, one or more motors 132, and so forth. In the event the temperature exceeds a threshold value, the component associated with that device temperature sensor 330 may be shut down. For example, the threshold value may be determined based on component specifications, such as a maximum permissible temperature of the batteries 280.

One or more interlock sensors 332 may provide data to the safety module 218 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyrometer 334 may provide information indicative of rotation of an object affixed thereto. For example, a gyrometer 334 may generate sensor data 152 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyrometer 334 in the accelerometer 336 may comprise a prepackaged solid-state inertial measurement unit (IMU) 136 that provides multiple axis pyrometers 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 152 indicative of impinging light. For example, the photodetector 342 may provide data indicative of a color, intensity, duration, and so forth.

A camera 344 generates sensor data 152 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 152 comprising images being sent to the autonomous navigation module 164. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 164 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels 130 in contact with the floor may include an allegedly conductive pathway between the circuitry and the floor. By using two or more of these wheels 130, the circuitry may measure one or more of the electrical properties of the floor. Information obtained by the floor analysis sensor 356 may be used by one or more of the safety module 218, the autonomous navigation module 164, the task module 230, and so forth. For example, if the floor analysis sensor 356 determines that the floor is wet, the safety module 218 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 134 may include a radar 360. The radar 360 may be used to provide information as to a distance, lateral position, and so forth, to an object.

The sensors 134 may include a passive infrared (PIR) sensor 362. The PIR sensor 362 may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 164. One or more touch sensors may be utilized to determine contact with a user or other objects.

The AMD 104 may include one or more output devices 212. A motor 132 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 132 with an eccentric weight may be used to create a buzz or vibration to allow the AMD 104 to simulate the purr of a cat.

Figure 4:
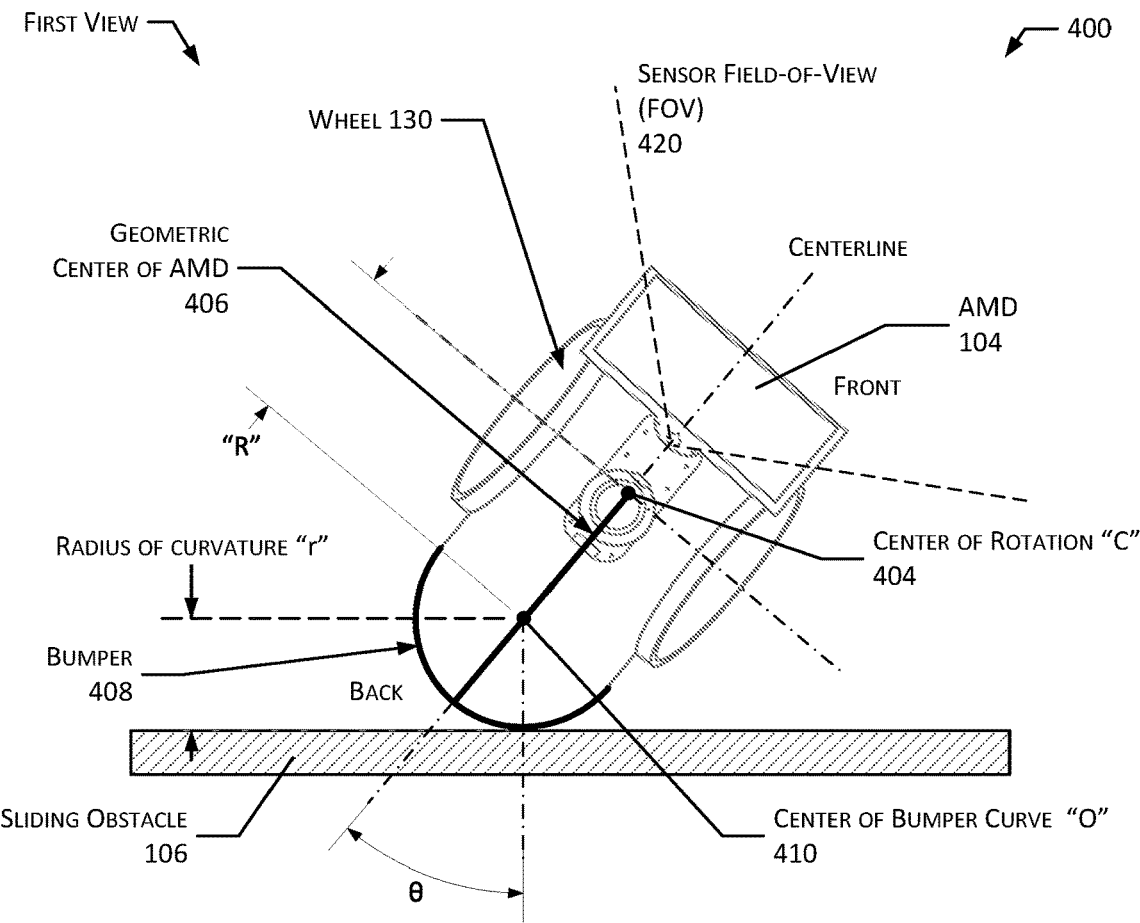
FIG. 4 is a diagram of the AMD, according to some implementations.
Figure 4:
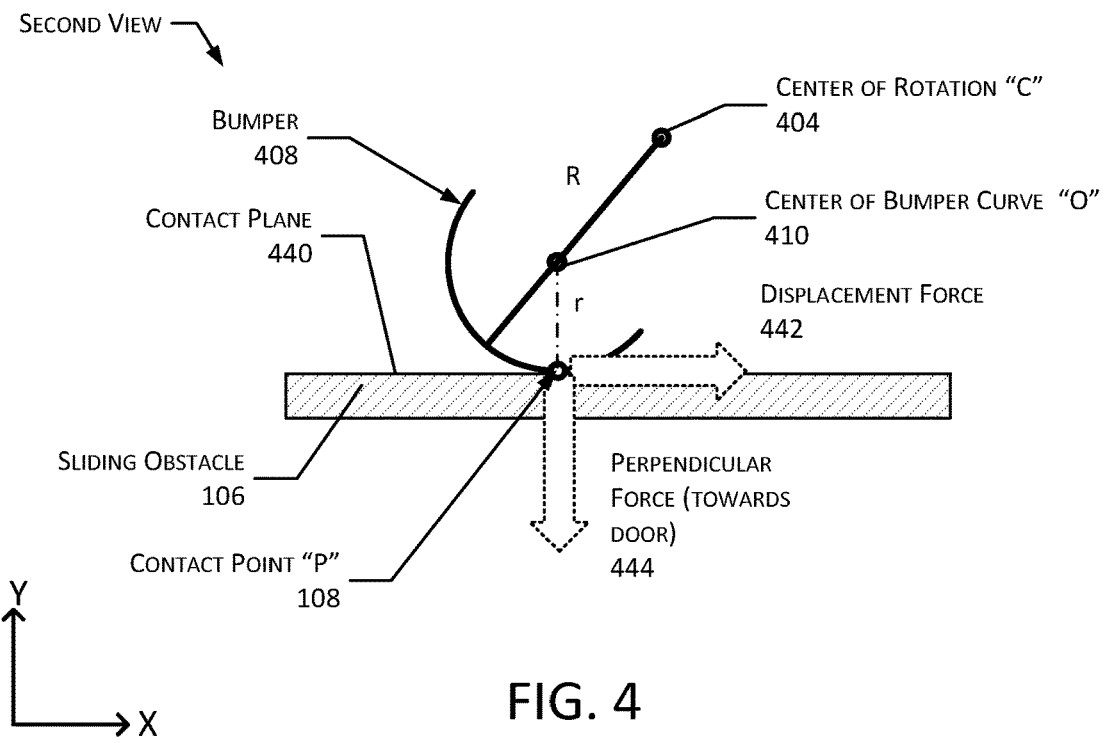

FIG. 4 is a diagram 400 of the AMD 104, according to some implementations. A first view includes a representation of the AMD 104. The AMD includes a pair of wheels 130, one arranged to a left of a centerline of a chassis or other structure and one arranged to a right of the centerline.

One or more sensors 134, such as a camera 344, is shown with a sensor field of view (FOV) 420 that is directed forwards, away from the AMD 104, centered on the centerline. The main sensors 134, that is sensors 134 that are typically used during autonomous forward movement of the AMD 104, may have FOVs that are directed generally to the left, front, and right. The AMD 104 may have few or no sensors 134 that have a backward-directed FOV.

The structure also has a front and a back. The wheels 130 are unidirectional. In one implementation, each wheel 130 may be connected to a separate motor 132, allowing for differential operation and permitting the AMD 104 move forward, backward, or rotate with respect to a center of rotation "C" 404. A caster wheel (not shown) may be present proximate to the back of the AMD 104. The center of rotation "C" 404 is offset with respect to a geometric center of the AMD 406.

The AMD 104 may include a bumper 408 or other portion of the structure that is intended to come into contact with the sliding obstacle 106. The bumper 408 may comprise a compliant material or structure. For example, the bumper 408 may comprise a mechanically compliant material, such as an elastomeric material, a pneumatic cushion, an expanded elastomeric foam, one or more mechanical spring elements, and so forth. In some implementations, the bumper 408 may comprise a non-marking or low-marking material to prevent inadvertent marking or deposition of material from the bumper 408 onto the sliding obstacle 106.

In some implementations, the bumper 408 may be mounted to a back of the AMD 104. In some implementations the main sensors 134, such as stereovision, cameras 344, lidar, and so forth, may have fields-of-view (FOV) that are directed towards a front of the AMD 104. The bumper 408 in the rear of the AMD 104 may be outside of these FOVs. By using a rear mounted bumper 408, the AMD 104 avoids the possibility of damage due to possible collision of expensive sensors 134 with the sliding obstacle 106 while also maintaining proper operation of those sensors 134. For example, if the AMD 104 were to use a front mounted bumper 408 to manipulate the sliding obstacle 106, the sliding obstacle 106 may be less than a minimum working distance from those sensors 134. In effect, the AMD 104 may be too close to "see" the sliding obstacle 106. Also, with the FOV directed towards the door, the AMD 104 may experience a lack of localization data. For example, there may be insufficient information in an image of the sliding obstacle 106 to provide adequate localization by SLAM. By facing away from the sliding obstacle 106 while performing the manipulation, the AMD 104 is able to continue to gather information from the physical space 102 and determine localization data that is indicative of the location and orientation of the AMD 104 with respect to the physical space 102. Having the sensor FOV 420 directed away from the sliding obstacle 106 may also improve the sensor data 152 that is available to the AMD 104 to determine events occurring in the physical space 102.

In some implementations, the AMD 104 is able to manipulate the sliding obstacle 106 without sensors 134 that have a FOV directed towards the sliding obstacle 106. For example, in implementations where a rear-mounted bumper of the AMD 104 is used to displace the sliding obstacle 106, the AMD 104 may not have optical sensors 320, cameras 344, radar 360, and so forth with respective FOVs directed toward the rear of the AMD 104.

The bumper 408 may have a perimeter that describes an arcuate or curved shape with a radius of curvature "r" with respect to a center of bumper curve "O" 410. In other implementations the bumper 408 may describe other shapes, such as an ellipse. For example, the radius of curvature "r" may vary based on relative angular position with respect to the centerline.

The AMD 104 may include one or more sensors 134 having specified fields of view (FOV), within which information may be acquired by the sensors 134. For example, a FOV of a camera 344 may comprise the solid angle of a scene within which an image may be acquired. One or more of the sensors 134 may have their FOV directed forwards. For example, a stereovision camera, lidar, and so forth may have their respective FOV pointing forward such that sensor data 152 may be acquired along an expected direction of travel of the AMD 104 during operation. In comparison, the AMD 104 may include few or no sensors 134 that have a FOV extending backwards. As a result, as the AMD 104 approaches the sliding obstacle 106 and during the performance of the slide trajectory, the sensor FOV 420 of forward facing sensors 134 may be away from the sliding obstacle 106.

Also shown is θ(theta), indicative of an angle between the centerline of the AMD 104 where it intersects a contact plane 440 of the sliding obstacle 106, a perpendicular line extending from the contact plane 440 to "O" 410.

The contact plane 440 comprises a plane described by a surface of the sliding obstacle 106 that is proximate to the AMD 104. In this illustration the contact plane 440 is depicted as a smooth plane. It is understood that the contact plane 440 may have other surface features, textures, and so forth. In some implementations, the sliding obstacle 106 may comprise a grate or other structure that has a plurality of parts such as parallel bars, perpendicular bars, a crosshatch pattern, and so forth.

Also shown is a chassis radius "R" extending along the centerline from the center of rotation "C" 404 to the center of bumper curve "O" 410.

In the second view, the details of the AMD 104 have been omitted, leaving a simplified representation of the AMD 104 comprising the center of rotation "C" 404, the bumper 408, the center of bumper curve "O" 410, the chassis radius "R", and the bumper radius of curvature "r". Also shown is the contact point 108, indicative of the point at which the bumper 408 comes into contact with the contact plane 440.

During operation of the slide trajectory module 172, the movement of the AMD 104 imparts, via the contact point 108, a force upon the sliding obstacle 106. For ease of illustration, this force may be decomposed into two orthogonal components: a displacement force 442 that is directed along the single straight linear axis that the sliding obstacle 106 may itself move, and a perpendicular force 444 that is perpendicular to the singe linear axis and is directed away from the AMD 104. During operation of the slide trajectory module 172, the slide trajectory data 174 is configured to produce a non-zero displacement force 442 in a particular direction, while maintaining a non-zero perpendicular force 444 to maintain affirmative contact and physical engagement between the AMD 104 and the sliding obstacle 106.

In the following equations, the x, y, and z axes are mutually orthogonal. The x and y axes define a horizontal plane, such as the floor, while the z axis specifies a height above ground. Let:

"C" be the center of rotation 404.

"P" be the contact point 108 where the bumper 408 comes into contact with the sliding obstacle 106.

"O" be the center of the bumper curve 410.

"R" be the distance between the center of rotation "C" 404 and the center of bumper curve "O" 410.

"r" be the radius from the center of bumper curve "0" 410 to an exterior perimeter of the bumper 408.

θ(theta) is an angle between the centerline of the AMD 104 where it intersects a contact plane 440 of the sliding obstacle 106, and a perpendicular line extending from the contact plane 440 to "O" 410.

"t" is time.

r(θ) is bumper curve radius of curvature in polar coordinates(Equation 1)

$$\dot{r}(\theta) = \frac{dr(\theta)}{d\theta} \quad \text{(Equation 2)}$$

$$w = \dot{\theta}(t) \quad \text{(Equation 3)}$$

The characteristic of the non-holonomic wheels 130 may be expressed in the following equations:

$$\vec{x} = \begin{bmatrix} x(t) \\ y(c) \\ \theta(t) \end{bmatrix} \quad \text{(Equation 4)}$$

$$y = r(\theta) + R\cos\theta, \frac{dr}{dt} = w \cdot \frac{dr}{d\theta} \quad \text{(Equation 5)}$$

$$\dot{y}(t) = \dot{r}(\theta) \cdot w - Rw\sin\theta(t) \quad \text{(Equation 6)}$$

$$\dot{y}(t) = w(\dot{r}(\theta) - R\sin\theta) \quad \text{(Equation 7)}$$

$$\begin{bmatrix} \dot{x}(t) \\ \dot{y}(t) \\ \dot{\theta}(t) \end{bmatrix} = \begin{bmatrix} \cos\theta\ (t)0 \\ \sin\theta\ (t)0 \\ 0\ \ \ 1 \end{bmatrix} \begin{bmatrix} \mathcal{U}(t) \\ w(t) \end{bmatrix} 4r(t)w(t) \text{ where} \quad \text{(Equation 8)}$$

$\mathcal{U}(t)$ and $w(t)$ are control variables.

Given the non-holonomic arrangement of wheels 130 and the equations, above, the non-holonomic motion constraints that may be expressed in the movement constraint data 170 may be as follows:

$$-\dot{x}\sin\theta + \dot{y}\cos\theta = 0 \quad \text{(Equation 9)}$$

$$\dot{x} = w(\dot{r}(\theta) - R\sin\theta)\cot\theta, \theta \neq 0 \quad \text{(Equation 10)}$$

$$\dot{x} = w[\dot{r}(\theta)\cdot\cot\theta - R\cos\theta], \theta \neq 0, \dot{x} = 0 \text{ when} \theta = 0 \quad \text{(Equation 11)}$$

$$v^2 = \dot{x}^2 + \dot{y}^2 = w^2[\dot{r}(\theta)\cdot\cot\theta - R\cos\theta]^2 \csc^2\theta \quad \text{(Equation 12)}$$

$$v = w[\dot{r}(\theta)\cdot\cot\theta - R\cos\theta]\csc\theta, \theta \neq 0 \quad \text{(Equation 13)}$$

$$\theta(t) = \tan^{-1}\left(\frac{\dot{y}(L)}{\dot{x}(L)}\right) + kt \text{ where } k \text{ is a constant} \quad \text{(Equation 14)}$$

$$\dot{r}(\theta) = \frac{dr(\theta)}{d\theta} \quad \text{(Equation 15)}$$

Given the non-holonomic motion constraints described above, an Euler integral may be defined and used by the slide trajectory module 172 to determine a next pose 110 to apply a displacement force 442. The Euler integral is shown below.

$$x(t+1) \leftarrow x(t) + w(\dot{r}(\theta) - R\sin\theta)\cdot\cot\theta \quad \text{(Equation 16)}$$

$$y(t+1) \leftarrow y(t) + w(\dot{r}(\theta) - R\sin\theta) \quad \text{(Equation 17)}$$

$$\theta(t+1) \leftarrow \theta(t) + \Delta\theta \quad \text{(Equation 18)}$$

The IMU data 154 comprising information may then be used as follows:

$$w(t+1) \leftarrow \frac{\dot{x}(t)\ddot{y}(t) - \dot{y}(t)\ddot{x}(t)}{\dot{x}^2(t) + \dot{y}^2(t)} = \frac{\dot{x}(t)\ddot{y}(t) - \dot{y}(t)\ddot{x}(t)}{\mathcal{U}^2(t)} \quad \text{(Equation 19)}$$

By utilizing the above equations, the slide trajectory module 172 may determine a set of poses 110, or a set of contact points 108 that are then used to derive respective poses 110, to achieve particular characteristics. For example, the equations may be solved to determine a particular tangential velocity with respect to the bumper 408.

In some implementations, to allow for tolerance of noise in sensor data 152, variances in localization data that specify a current pose of the AMD 104 with respect to the physical space 102, and so forth, the contact point 108 may be a location that is within the sliding obstacle 106. For example, the contact point 108 that is used to determine a pose 110 may be 1 centimeter within the sliding obstacle 106. During approach to the sliding obstacle 106 the velocity of the AMD 104 may be reduced, to avoid an abrupt collision with the sliding obstacle 106. By moving the AMD 104 to a contact point 108 that is slightly inside the sliding obstacle 106, physical contact is assured.

The movement system 128 may use other arrangements of wheels 130, legs, treads, and so forth. In those implementations, the various non-holonomic constraints illustrated above would be updated accordingly to correspond to the implementation in use.

In some implementations, the AMD 104 may use the sensor data 152 to determine when physical contact has occurred, and whether physical contact is ongoing during movements to apply a displacement force 442. For example, during the movement to the initial pose 110(1), the AMD 104 may cease movement if the IMU data 154 indicates that one or more of acceleration or rotation is less than a given first threshold, if the motor torque data 156 increases above a second threshold, and so forth. The thresholds may be based on the unimpeded movement of the AMD 104 and the commanded movement. For example, if the AMD 104 is commanded to move backward at 1 cm/second, an acceleration to the back is expected at about 1 cm/second. An acceleration that is less, such as below 0.5 cm/second may indicate that the AMD 104 has encountered an obstacle, such as the sliding obstacle 106.

Figure 5:
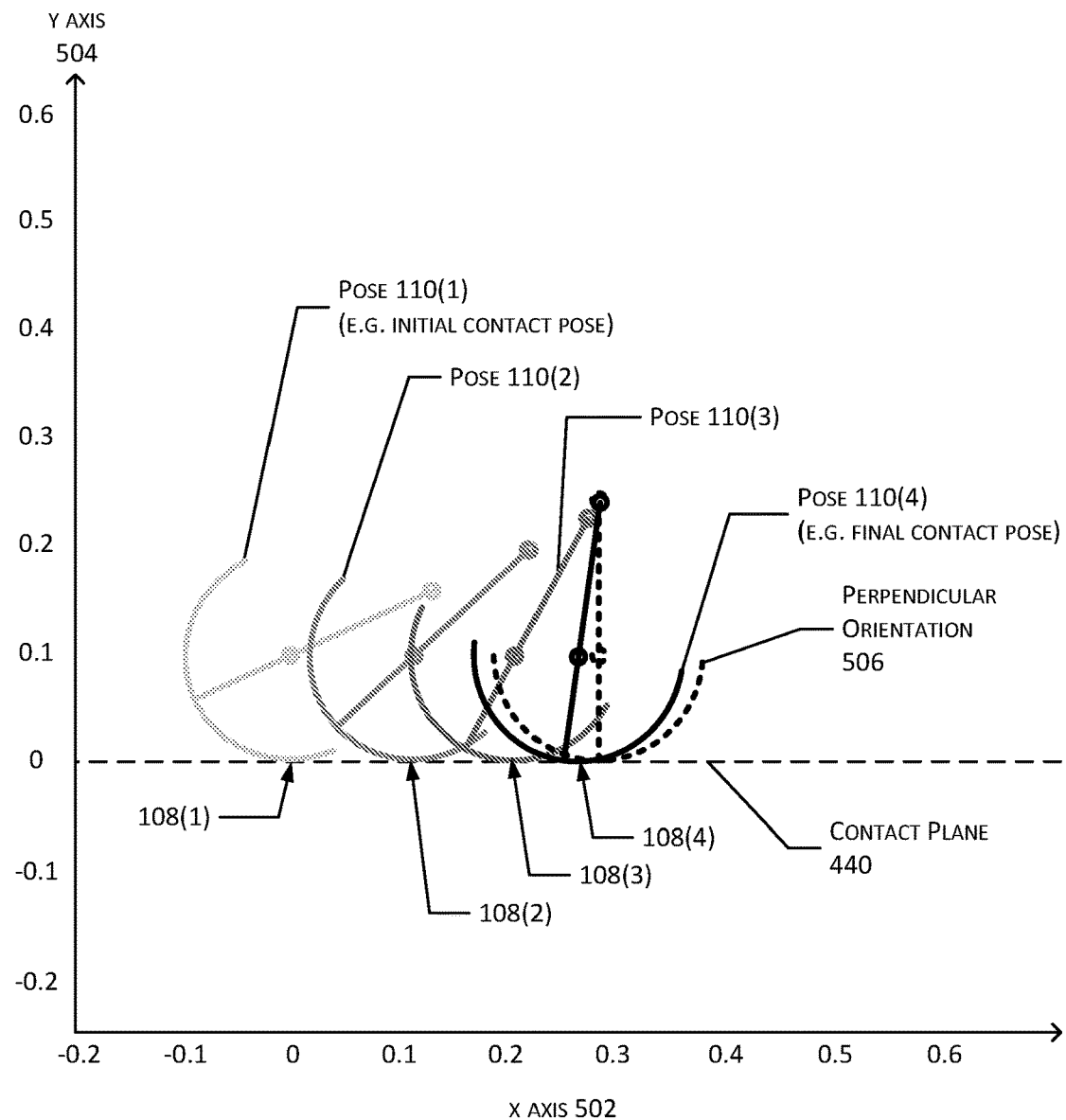
FIG. 5 illustrates a series of poses of an AMD manipulating a sliding obstacle, according to some implementations.

FIG. 5 illustrates at 500 a series of poses of the AMD 104 manipulating a sliding obstacle 106, according to some implementations. For clarity the simplified representation of FIG. 4 is used. In this illustration the x axis 502 is arranged horizontally while the y axis 504 is arranged vertically. A sliding obstacle 106 (not shown) presents a contact plane 440 that extends horizontally along a y axis value of 0.

The slide trajectory module 172 has determined slide trajectory data 174 that represents at least an initial contact point 108(1) and an initial pose 110(1). The slide trajectory data 174 may comprise other information, such as an expected final pose 110(F), direction that the displacement force 442 is to be applied, and so forth. In some implementations, the slide trajectory data 174 for poses after the initial pose 110(1) may be determined based on the sensor data 152, such as using the Euler integral described with regard to FIG. 4.

This illustration shows poses 110(1) through 110(4). Four poses are shown by way of illustration, and not necessarily as a limitation. Each pose 110 is associated with a different time, however the time between poses may differ. The slide trajectory module 172 may determine fewer or more poses.

The poses 110(1)-(4) are constrained based on the movement constraint data 170 and by maintaining contact between some portion of the bumper 408 and the sliding obstacle 106. In the implementation shown, the series of poses 110(1)-(4) produce a sweeping motion, with the bumper 408 remaining in contact with the sliding obstacle 106 while the center of rotation "C" 404 and the front of the AMD 104 changes direction.

In this illustration, a perpendicular orientation 506 is shown for reference. In some implementations, given the movement constraints, the perpendicular orientation 506 may be deemed infeasible or undesirable. For example, in the perpendicular orientation 506 the AMD 104 may be unable to apply sufficient displacement force 442 to move the sliding obstacle 106.

Figure 6:
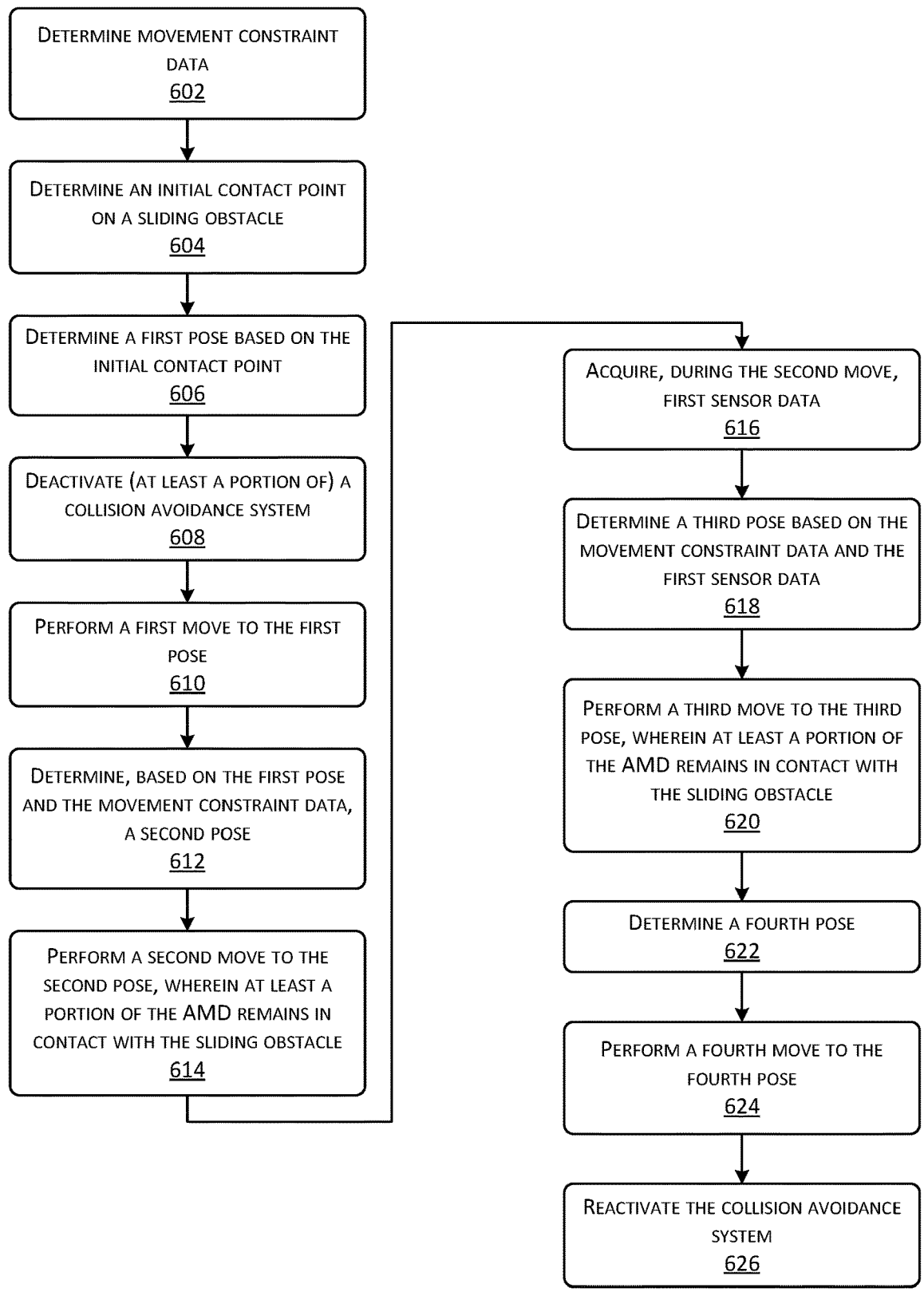
FIG. 6 is a flow diagram of a process to manipulate a sliding obstacle, according to some implementations.

FIG. 6 is a flow diagram 600 of a process to manipulate a sliding obstacle 106, according to some implementations.

At 602 movement constraint data 170 indicative of non-holonomic motion of the movement system 128 is determined. The movement system 128 is affixed to, or part of, the structure or chassis of the AMD 104. The movement constraint data 170 may be determined based on physical dimensions of the AMD 104, placement of unidirectional wheels 130, which wheels 130 may be driven by a motor 132, and so forth.

At 604 an initial contact point 108(1) is determined on a sliding obstacle 106, such as a sliding door. In one implementation, the initial contact point 108 may be determined based on a size of the bumper 408 and one or more of the first edge or second edge of the sliding obstacle 106. For example, a radius value is retrieved that is indicative of a radius of curvature "r" of the bumper 408. A first edge of the sliding obstacle 106 and a second edge of the sliding obstacle 106 are determined. For example, the mapping module 160 or another system may provide information about the location of the edges in the physical space 102. The initial contact point 108(1) may be determined to be at a point on the sliding obstacle 106 that is greater than or equal to the radius value away from one or more of the first edge or the second edge. This allows sufficient space for the AMD 104 to approach and manipulate the sliding obstacle 106.

In some implementations, other techniques may be used to select the initial contact point 108(1). For example, the initial contact point 108(1) may be located approximate at a midpoint between the first edge and the second edge. In another example, the initial contact point 108(1) may be selected as proximate to an edge of the sliding obstacle 106 towards which the sliding obstacle 106 is to be moved. For example, if the sliding door is to be slid to the right, the initial contact point 108(1) may be proximate to the right edge of the sliding door. The initial contact point 108(1) may also take into consideration the overall area within the physical space 102 that the set of poses is expected to use. For example, the initial contact point 108(1) may be determined based on the occupancy map 162 to allow for sufficient free space to move while performing the slide trajectory specified by the slide trajectory module 172.

At 606 a first pose 110(1) is determined based on the initial contact point 108(1). For example, the first pose 110(1) may be determined by the slide trajectory module 172 to place the AMD 104 at a specified angle θ to begin the slide trajectory. In another implementation, the initial contact point 108(1) with respect to the sliding obstacle 106 and a point with respect to the AMD 104 may be provided to the autonomous navigation module 164. The autonomous navigation module 164 may then determine the first pose 110(1) that places the specified point on the AMD 104 in contact with the sliding obstacle 106 at the specified initial contact point 108(1).

At 608 a collision avoidance system, or at least a portion thereof, is deactivated. For example, the safety module 218 may receive instructions to disable collision avoidance with respect to obstacles that are behind the AMD 104. Deactivation of the collision avoidance system allows the AMD 104 to come into contact with the sliding obstacle 106 as intended.

At 610 a first move is performed using the movement system 128 to move the AMD 104 to the first pose 110(1). For example, the autonomous navigation module 164 may determine path plan data 248 that moves the AMD 104 from a current location to the first pose 110(1).

During at least part of the first move, the front of the AMD 104 is directed generally away from the contact plane 440 of the sliding obstacle 106. As a result, sensors 134 having a front-facing FOV 420 may be unable to detect the sliding obstacle 106, or at least the portion of the sliding obstacle 106 that is to the back of the AMD 104.

During the first move, the sensors 134 may be used to acquire sensor data 152. In one implementation, the AMD 104 may acquire first image data using the camera 344 having the FOV 420 that is directed away from the sliding obstacle 106 during at least a portion of the first move. The first image data may be processed to determine first localization data. In some implementations, the first localization data may be used to determine when the AMD 104 has attained the first pose 110(1) or is within a threshold value of the first pose 110(1). In some implementations, the first localization data may be used to determine when the AMD 104 has stopped moving, and thus has come into contact with the sliding obstacle 106.

In some implementations, due to various issues such as noise in the sensor data 134, uncertainties due to localization, and so forth, the AMD 104 may attempt to move to contact point 108 that is inside the sliding obstacle 106. To avoid damaging the AMD 104 or the sliding obstacle 106, it may be advantageous to stop movement once the AMD 104 has come into physical contact with the sliding obstacle 106, rather than attempting to "drive through" the sliding obstacle 106. In this implementation, the first move is stopped based on one or more of: the IMU data 154 acquired during the first move indicating acceleration that is less than a first threshold value, or the motor torque data 156 acquired during the first move indicating one or motor torques that are greater than a second threshold value. As describe above, these thresholds may be based on the unimpeded movement of the AMD 104.

In some implementations the AMD 104 may include a contact sensor, such as a bumper switch 314. The output from the contact sensor may be used to determine if the AMD 104 has made contact with the sliding obstacle 106. For example, once contact is determined based on sensor data 152 from the bumper switch 314, the first move may stop.

At 612, based on the first pose 110(1) and the movement constraint data 170, a second pose 110(2) is determined. This determination may utilize the Euler integral described above. The first pose 110(1) may be retrieved from memory or may be based on localization data provided by SLAM or another localization system. The slide trajectory module 172 determines the second pose 110(2) consistent with the non-holonomic movement constraints and the constraint to maintain contact between the bumper 408 or other portion of the AMD 104 and the sliding obstacle 106 while providing a displacement force 442.

At 614 a second move is performed using the movement system 128 to move the AMD 104 to the second pose 110(2). During the second move at least a portion of the AMD 104, such as the bumper 408, remains in contact with the sliding obstacle 106. Because of the interaction between the AMD 104, the floor, the sliding obstacle 106, and so forth, the second pose 110(2) as achieved may differ from that intended.

In some implementations the AMD 104 may include a contact sensor, such as a bumper switch 314. The output from the contact sensor may be used to determine if the AMD 104 has maintained contact with the sliding obstacle 106. For example, if during the second move the contact is deemed to be broken based on sensor data 152 from the bumper switch 314, the second move may stop. Based on this, the AMD 104 may move to place the bumper 408 into contact with the sliding obstacle 106.

During the second move, the front of the AMD 104 is directed generally away from the contact plane 440 of the sliding obstacle 106. As a result, sensors 134 having a front-facing FOV 420 may be unable to detect the sliding obstacle 106, or at least the portion of the sliding obstacle 106 that is to the back of the AMD 104.

At 616, during the second move, first sensor data 152 is acquired. For example, during the second move, first IMU data 154(1) may be acquired using the IMU 136. During the second move first motor torque data 156(1) may be acquired using the one or more motor torque sensors 138.

During the second move, the other sensors 134 may be used to acquire sensor data 152. In one implementation, the AMD 104 may acquire second image data using the camera 344 having the FOV 420 that is directed away from the sliding obstacle 106 during at least a portion of the second move. The second image data may be processed to determine second localization data. In some implementations, the second localization data may be used to determine when the AMD 104 has attained the second pose 110(2) or is within a threshold value of the second pose 110(2).

At 618 a third pose 110(3) is determined, based on the movement constraint data 170 and at least a portion of the first sensor data 154. This determination may utilize the Euler integral described above. For example, the slide trajectory module 172 may determine the third pose 110(3) based on the first IMU data 154(1) and the first motor torque data 156(1).

At 620 a third move is performed using the movement system 128 to move the AMD 104 to the third pose 110(3). During the third move at least a portion of the AMD 104, such as the bumper 408, remains in contact with the sliding obstacle 106.

As above with respect to the second move, sensor data 154 may be used to determine if physical contact with the sliding obstacle 106 was maintained during the move. For example, IMU data 154, motor torque data 156, contact sensor data, and so forth may be used. If during the third move the contact is deemed to be lost, the move may stop. Based on this, the AMD 104 may move to re-establish physical contact with the sliding obstacle 106.

During the third move, the front of the AMD 104 is directed generally away from the contact plane 440 of the sliding obstacle 106. As a result, sensors 134 having a front-facing FOV 420 may be unable to detect the sliding obstacle 106, or at least the portion of the sliding obstacle 106 that is to the back of the AMD 104.

During the third move, the sensors 134 may be used to acquire sensor data 152. In one implementation, the AMD 104 may acquire third image data using the camera 344 having the FOV 420 that is directed away from the sliding obstacle 106 during at least a portion of the third move. The third image data may be processed to determine third localization data. In some implementations, the third localization data may be used to determine when the AMD 104 has attained the third pose 110(3) or is within a threshold value of the third pose 110(3).

The process may proceed with subsequent poses 110 and moves until an end state is reached. The slide trajectory module 172 may impose a final pose constraint during operation. For example, the slide trajectory module 172 may permit intermediate poses 110 up to and ending at the fourth pose 110(4), avoiding attempts to move to the perpendicular orientation 506. In another example, a maximum number of possible poses 110, maximum amount of time spent trying to manipulate the sliding obstacle 106, and so forth may be used to determine the end state has been reached.

Once the end state is reached, the slide trajectory module 172 may complete action, determine a new initial contact pose 110(1) for another set of poses intended to manipulate the sliding obstacle 106 into a desired state, or take other actions. For example, if the sliding door remains partially closed after the first set of poses, another set of poses may be executed to open the sliding door further.

At 622 a fourth pose is determined. The fourth pose may be greater than a first distance from the sliding obstacle 106, and in some implementations from any other obstacle. The first distance may be a distance associated with operation of the collision avoidance system. For example, the fourth pose may be greater than the minimum distance that the collision avoidance system is configured to maintain to avoid collisions.

At 624 a fourth move is performed using the movement system 128 to move the AMD 104 to the fourth pose. Once in the fourth pose, the AMD 104 is now clear of nearby obstacles.

At 626, having reached the fourth pose, the AMD 104 may reactivate the collision avoidance system, or portion thereof.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
   a structure comprising a bumper;
   a non-holonomic movement system affixed to the structure, the movement system comprising one or more motors;
   an inertial measurement unit (IMU);
   one or more motor torque sensors; and
   one or more processors to execute instructions to:
      determine movement constraint data indicative of non-holonomic motion of the movement system;
      determine an initial contact point on a sliding door;
      determine a first pose based on the initial contact point;
      perform a first move, using the movement system, to the first pose;
      determine, based on the first pose and the movement constraint data, a second pose;
      perform a second move, using the movement system, to the second pose, wherein during the second move a portion of the bumper remains in contact with the sliding door;
      acquire, during the second move, first IMU data using the IMU;
      acquire, during the second move, first motor torque data using the one or more motor torque sensors;
      determine a third pose, based on the movement constraint data, the first IMU data, and the first motor torque data; and
      perform a third move, using the movement system, to the third pose, wherein during the third move the bumper remains in contact with the sliding door.

2. The AMD of claim 1, the one or more processors to execute instructions to:
   acquire, during the first move, second IMU data using the IMU;
   acquire, during the first move, second motor torque data using the one or more motor torque sensors; and
   stop the first move based on one or more of:
      the second IMU data indicating acceleration that is less than a first threshold value, or
      the second motor torque data indicating a torque greater than a second threshold value, wherein the second threshold value is based on torque expected during unimpeded movement of the AMD.

3. The AMD of claim 1, further comprising:
   a camera having a first field-of-view (FOV) that is directed away from the sliding door during the second move and the third move; and
   the one or more processors to execute instructions to:
      acquire, during the first move, first image data using the camera;
      determine first localization data based on the first image data;
      wherein the AMD is determined to be at the second pose based on the first localization data;
      acquire, during the second move, second image data using the camera;

determine second localization data based on the second image data; and
wherein the AMD is determined to be at the third pose based on the second localization data.

4. The AMD of claim 1, wherein the initial contact point is greater than or equal to a first value away from one or more edges of the sliding door, and further wherein the first value is associated with a radius of the bumper.

5. The AMD of claim 1, wherein the bumper is affixed to a back of the structure and comprises a mechanically compliant material that is arranged in a curve.

6. The AMD of claim 1, further comprising a sensor associated with the bumper; and
the one or more processors to execute instructions to:
acquire sensor data using the sensor;
stop the first move based on the sensor data indicative of the bumper coming into contact with the sliding door; and
determine, based on the sensor data, that a same portion of the bumper remains in contact with the sliding door during the second move and the third move.

7. The AMD of claim 1, the one or more processors to execute instructions to:
deactivate a collision avoidance system before the first move;
determine a fourth pose, wherein the fourth pose is greater than a first distance from the sliding door;
after the third move, perform a fourth move, using the movement system, to the fourth pose; and
reactivate the collision avoidance system after the fourth move.

8. A computer-implemented method comprising:
determining movement constraint data indicative of non-holonomic motion of a device;
moving, at a first time, the device to a first pose, wherein a portion of the device comes into contact with a moveable obstacle;
determining, based on the first pose and the movement constraint data, a second pose;
moving, at a second time, the device to the second pose, wherein the portion of the device remains in contact with the moveable obstacle;
acquiring, during the second time, first sensor data;
determining, based on the movement constraint data and the first sensor data, a third pose; and
moving, at a third time, the device to the third pose, wherein the portion of the device remains in contact with the moveable obstacle.

9. The computer-implemented method of claim 8, further comprising:
stopping the moving at the first time based on one or more of:
second sensor data acquired by an inertial measurement unit indicates one or more accelerations or rotations of the device are less than a first threshold value,
third sensor data acquired by a motor torque sensor indicates motor torque is greater than a second threshold value, or
fourth sensor data acquired by a contact sensor indicates a physical contact between the device and an obstacle.

10. The computer-implemented method of claim 8, wherein during at least a portion of the moving the device to the first pose, a first field-of-view (FOV) of a camera of the device is directed away from the moveable obstacle.

11. The computer-implemented method of claim 8, further comprising:
retrieving a radius value indicative of a radius of a portion of the device that is expected to come into contact with the moveable obstacle;
determining a first edge of the moveable obstacle; and
wherein an initial contact point of the first pose is greater than or equal to a first value away from the first edge, and further wherein the first value is associated with a radius of the portion of the device that is expected to come into contact with the moveable obstacle.

12. The computer-implemented method of claim 8, further comprising:
stopping the moving at the first time based on second sensor data indicative of the device coming into contact with the moveable obstacle; and
determining, based on the second sensor data, that the device remains in contact with the moveable obstacle during the second time and during the third time.

13. The computer-implemented method of claim 8, further comprising:
determining during the second time or the third time that the device remains in contact with the moveable obstacle based on one or more of:
second sensor data acquired by an inertial measurement unit indicates one or more accelerations or rotations of the device are less than a first threshold value that is based on unimpeded movement of the device,
third sensor data acquired by a motor torque sensor indicates motor torque is greater than a second threshold value that is based on the unimpeded movement of the device, or
fourth sensor data acquired by a contact sensor indicates a physical contact between the device and an obstacle.

14. The computer-implemented method of claim 8, further comprising:
deactivating, before the first time, a collision avoidance system associated with the device;
determining a fourth pose that is greater than a first distance from the moveable obstacle;
moving, at a fourth time after the third time, the device to the fourth pose; and
activating, after the fourth time, the collision avoidance system.

15. A device comprising:
a structure;
a non-holonomic movement system affixed to the structure, the movement system comprising one or more motors;
one or more sensors; and
one or more processors to execute instructions to:
determine movement constraint data indicative of non-holonomic motion supported by the movement system;
perform a first move of the device to a first pose, wherein the device comes into contact with a moveable obstacle, wherein the moveable obstacle is constrained to motion along a single linear axis;
determine, based on the first pose and the movement constraint data, a second pose;
perform a second move of the device to the second pose, wherein during the second move the device remains in contact with the moveable obstacle;
acquire, during the second move, first sensor data;
determine, based on the movement constraint data and the first sensor data, a third pose; and perform a third move of the device to the third pose, wherein during the third move the device remains in contact with the moveable obstacle.

16. The device of claim 15, the one or more sensors comprising:
an inertial measurement unit (IMU) to determine acceleration with respect to one or more axes; and
one or more motor torque sensors; and
the one or more processors to execute instructions to:
acquire, during the first move, first IMU data using the IMU;
acquire, during the first move, first motor torque data using the one or more motor torque sensors; and
stop the first move based on one or more of:
the first IMU data indicating acceleration that is less than a first threshold value that is associated with unimpeded movement of the device, or
the first motor torque data indicating one or motor torques that are greater than a second threshold value, wherein the second threshold value is based on torque expected during unimpeded movement of the device.

17. The device of claim 15, further comprising:
a camera having a first field-of-view (FOV) that is directed away from the moveable obstacle during the second move and the third move; and
the one or more processors to execute instructions to:
acquire, during the first move, first image data using the camera;
wherein the device is determined to be at the second pose based on the first image data;
acquire, during the second move, second image data using the camera; and
wherein the device is determined to be at the third pose based on the second image data.

18. The device of claim 15, wherein the first pose is associated with the device coming into contact with the moveable obstacle at an initial contact point that is greater than or equal to a first value away from one or more edges of the moveable obstacle, and further wherein the first value is associated with a radius of a portion of the device that comes into contact with the moveable obstacle.

19. The device of claim 15, the non-holonomic movement system further comprising a pair of unidirectional wheels having a center of rotation about a horizontal plane that is offset from a geometric center of the structure; and
wherein a portion of the device that is in contact with the moveable obstacle is affixed to a back of the structure and comprises a mechanically compliant material that is arranged in a curve.

20. The device of claim 15, further comprising a first sensor associated with a portion of the device that is in contact with the moveable obstacle; and
the one or more processors to execute instructions to:
acquire second sensor data with the first sensor;
stop the first move based on the second sensor data indicative of the device coming into contact with the moveable obstacle;
determine, based on the second sensor data, that the device remains in contact with the moveable obstacle during the second move; and
determine, based on the second sensor data, that the device remains in contact with the moveable obstacle during the third move.

\* \* \* \* \*

UNITED STATES PATENT AND TRADEMARK OFFICE
CERTIFICATE OF CORRECTION

| | |
|---|---|
| PATENT NO. | : 12,038,760 B1 |
| APPLICATION NO. | : 17/659088 |
| DATED | : July 16, 2024 |
| INVENTOR(S) | : Shantanu Thakar et al. |

It is certified that error appears in the above-identified patent and that said Letters Patent is hereby corrected as shown below:

In the Claims

Column 31, Claim 16, Line 18:
Currently reads "the first motor torque data indicating one or motor torques"
Where it should read --the first motor torque data indicating one or more motor torques--

Signed and Sealed this
Thirteenth Day of August, 2024

Katherine Kelly Vidal
*Director of the United States Patent and Trademark Office*